United States Patent
Chickering et al.

(10) Patent No.: US 8,103,537 B2
(45) Date of Patent: Jan. 24, 2012

(54) DECISION THEORETIC APPROACH TO TARGETED SOLICITATION BY MAXIMIZING EXPECTED PROFIT INCREASES

(75) Inventors: D. Maxwell Chickering, Redmond, WA (US); David E. Heckerman, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 749 days.

(21) Appl. No.: 11/257,473

(22) Filed: Oct. 24, 2005

(65) Prior Publication Data

US 2006/0036497 A1 Feb. 16, 2006

Related U.S. Application Data

(63) Continuation of application No. 09/681,050, filed on Dec. 8, 2000.

(51) Int. Cl.
*G06Q 99/00* (2006.01)

(52) U.S. Cl. ...... 705/7.29; 705/7.3; 705/7.31; 705/7.32; 705/7.33

(58) Field of Classification Search .......... 705/7.29, 705/7.3, 7.31, 7.32, 7.33
See application file for complete search history.

(56) References Cited

U.S. PATENT DOCUMENTS

| | | | | |
|---|---|---|---|---|
| 5,696,907 A | 12/1997 | Tom | ............................. | 705/38 |
| 5,701,400 A | 12/1997 | Amado | ............................. | 706/45 |
| 5,737,416 A * | 4/1998 | Cooper et al. | .................. | 705/52 |
| 6,044,357 A * | 3/2000 | Garg | ............................. | 705/10 |
| 6,072,047 A | 6/2000 | Rauch et al. | .................. | 536/23.5 |
| 6,092,047 A | 7/2000 | Hyman et al. | ............... | 705/36 R |
| 6,182,058 B1 * | 1/2001 | Kohavi | ............................. | 706/45 |
| 6,456,982 B1 | 9/2002 | Pilipovic | ...................... | 705/36 R |
| 6,556,979 B1 | 4/2003 | Liu et al. | .......................... | 706/20 |
| 6,567,786 B1 | 5/2003 | Bibelnieks et al. | ............. | 705/14 |
| 6,826,552 B1 * | 11/2004 | Grosser et al. | .................. | 706/47 |
| 6,901,373 B1 | 5/2005 | Chasko | ............................. | 705/14 |
| 2001/0032115 A1 | 10/2001 | Goldstein | ........................ | 705/10 |
| 2002/0026348 A1 | 2/2002 | Fowler et al. | .................... | 705/10 |
| 2003/0208402 A1 * | 11/2003 | Bibelnieks et al. | ............. | 705/14 |

FOREIGN PATENT DOCUMENTS

JP 04359365 A 12/1992

OTHER PUBLICATIONS

Buntine, "Learning Classification Trees", Statistics and Computing, 1992, (originally published Nov. 20, 1991), pp. 63-73, vol. 2.

(Continued)

*Primary Examiner* — Akiba Robinson Boyce
(74) *Attorney, Agent, or Firm* — Lee & Hayes, PLLC

(57) ABSTRACT

A decision theoretic approach to targeted solicitation, by maximizing expected profit increases, is disclosed. A decision theoretic model is used to identify a sub-population of a population to solicit, where the model is constructed to maximize an expected increase in profits. A decision tree in particular can be used as the model. The decision tree has paths from a root node to a number of leaf nodes. The decision tree has a split on a solicitation variable in every path from the root node to each leaf node. The solicitation variable has two values, a first value corresponding to a solicitation having been made, and a second value corresponding to a solicitation not having been made.

20 Claims, 12 Drawing Sheets

OTHER PUBLICATIONS

Chickering, et al. "A Clinician's Tool for Analyzing Non-Compliance", Proceedings of the Thirteenth National Conference on Artificial Intelligence and Eighth Innovative Applications of Artificial Intelligence Conference, AAAI 96, IAAI 96, Aug. 4-8, 1996, vol. 2, AAAI Press/The MIT Press, 1996, ISBN 0-262-51091-X (pp. 1269-1276).

Chickering, et al. "A Bayesian Approach to Learning Bayesian Networks with Local Structure", Proceedings of th 13th Conference on Uncertainty in AI, 1997, Providence, RI Morgan Kauffman.

Friedman, et al. "Learning Bayesian Networks With Local Structure", Proceedings of the 12th Conference on Uncertainty in AI, 1996, pp. 252-262, Portland OR, Morgan Kauffman.

Ling, "Data Mining for Direct Marketing: Problems and Solutions" Proceedings of the 4th International Conference on Knowledge Discovery in Databases, 1998, KDD-98, New York.

* cited by examiner

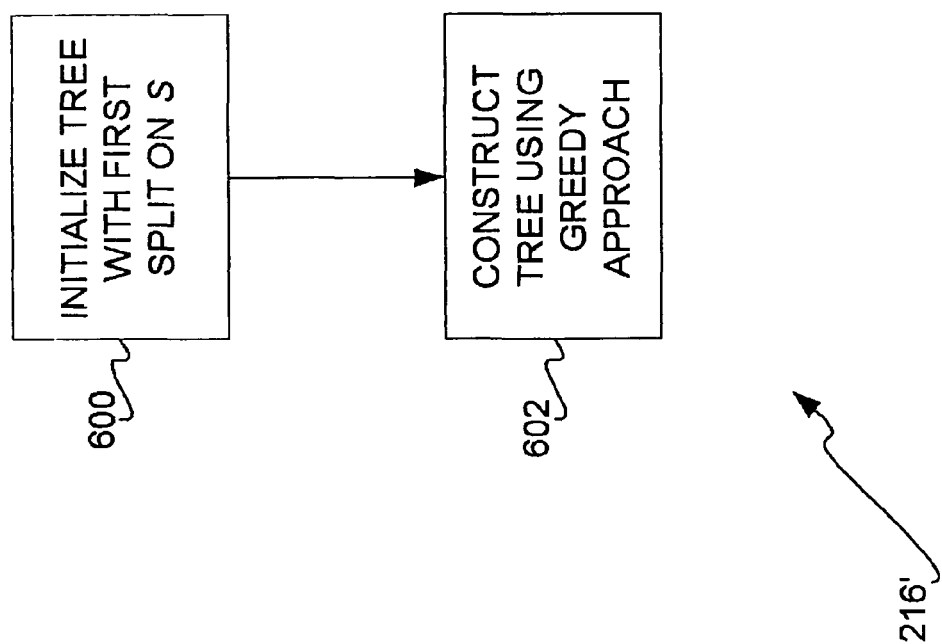

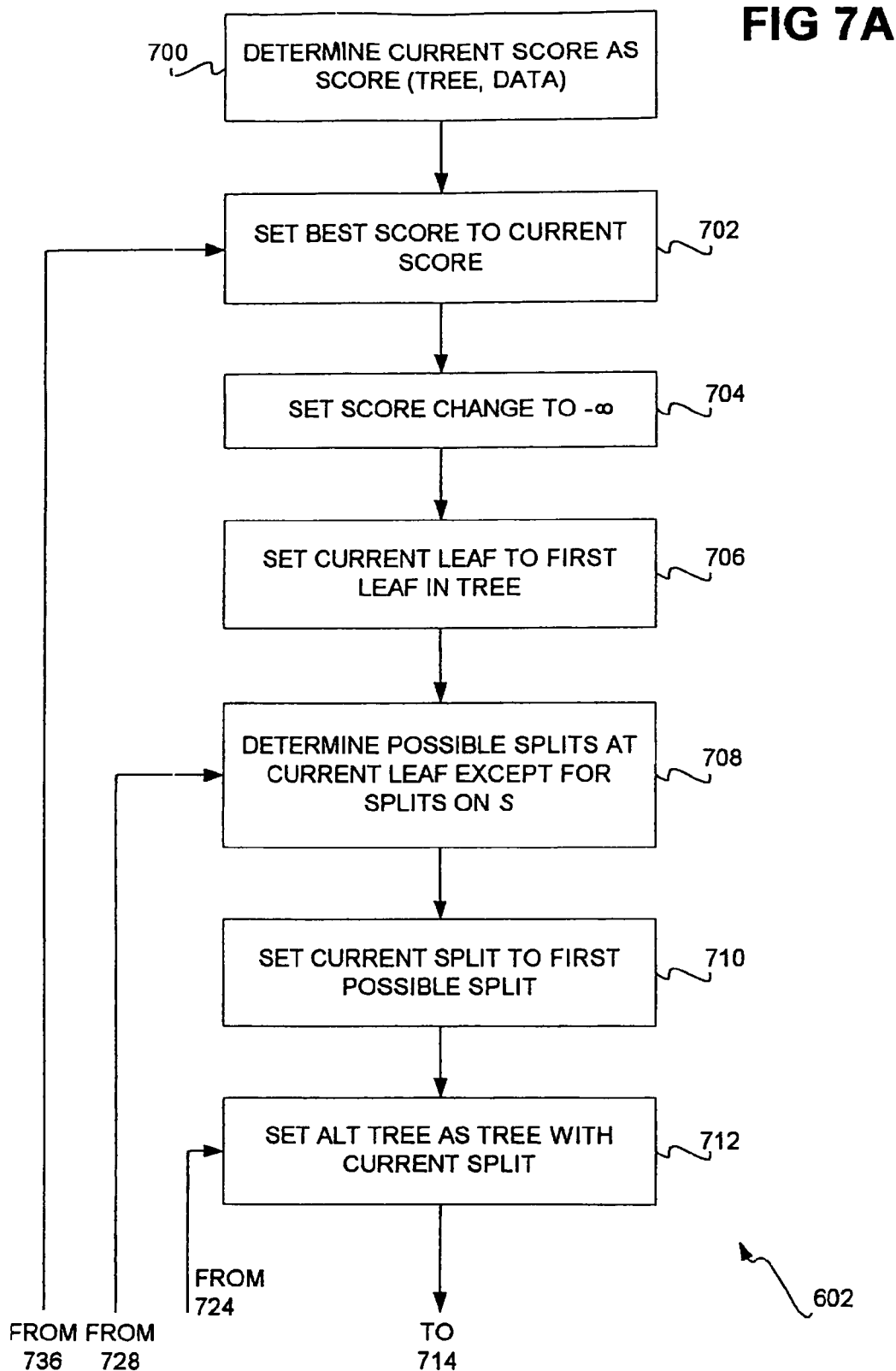

FIG 8
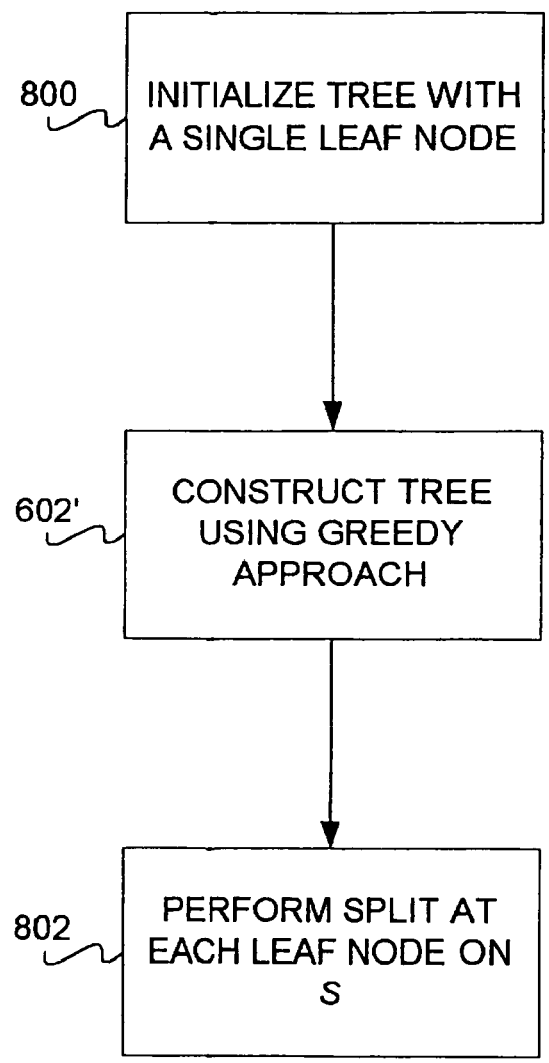
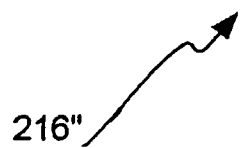

DECISION THEORETIC APPROACH TO TARGETED SOLICITATION BY MAXIMIZING EXPECTED PROFIT INCREASES

CROSS-REFERENCE TO RELATED APPLICATIONS

This application is a continuation of U.S. patent application Ser. No. 09/681,050, entitled "DECISION THEORETIC APPROACH TO TARGETED SOLICITATION BY MAXIMIZING EXPECTED PROFIT INCREASES", filed Dec. 8, 2000. The entirety of the above-noted application is incorporated herein by reference.

TECHNICAL FIELD

The invention relates generally to targeted solicitation, and more particularly to decision theoretic approaches to targeted solicitation.

BACKGROUND OF INVENTION

To acquire new customers, and persuade old customers to purchase more, advertisers commonly conduct solicitations. Solicitations may be in the form of direct mailing, phone calling, and e-mailing potential purchasers. Advertisers usually have at their disposal large databases of individuals to potentially solicit. These databases may have been purchased by the advertisers, or the advertisers may have collected the data on their own. The data for any given individual may be as rudimentary as the person's name, phone number, e-mail address, and mailing address, or may be enriched with demographic information. The demographic information may include the person's gender, income bracket, occupation, as well as other information.

A dilemma faced by the advertisers, however, is which individuals to solicit. Some people are likely to make a purchase regardless of whether they receive a solicitation, whereas others are likely to make a purchase only if they receive a solicitation. Some people may never make a purchase, even if the solicitation offers a steep discount in price. Still others may be offended by receiving a solicitation, and change their minds after having initially decided to make a purchase.

Within the prior art, there are at least two approaches for advertisers to follow to decide who to solicit in an advertising campaign. First, an advertiser may solicit everyone in its database, which is referred to as an untargeted approach. This is costly, however, and where the advertiser is offering a price discount, means that potential revenue is lost when the discount is redeemed by consumers who would have made a purchase anyway. The advertiser loses the cost of the solicitation when soliciting people who will never make a purchase, regardless of whether they receive the solicitation. Furthermore, the advertiser loses the business of those individuals who are offended by receiving the solicitation, and who would have otherwise made a purchase.

Second, the advertiser may solicit only some people in the database, which is referred to as a targeted approach. The question then becomes which individuals to target for solicitation. Advertisers may resort to decision theoretic approaches to answer this question. Decision theoretic approaches utilize statistical and probabilistic models to determine which people to solicit. Decision theoretic approaches can use Bayesian networks, decision trees, and other types of statistical models. However, current such approaches usually focus on one of two goals. First, the approaches may try to maximize consumer response to an advertising campaign. The advertiser, however, is not interested so much in maximizing the response, as it is in selling the most items at the highest price. These two goals may not be consistent with one another. For example, maximizing the response of individuals who would have made a purchase regardless of receiving the solicitation is not the aim of the advertiser.

Second, standard machine learning approaches that are used to construct statistical models from observed data are not well suited for the targeted solicitation problem. Particularly, these approaches are unable to incorporate advertiser profit as the ultimate utility of their learned models, and instead usually focus on predictive accuracy. As an example, the targeted solicitation problem requires a statistical model of the probability that a customer will make a purchase, given known attributes of the customer. The best statistical model to solve this problem, however, is not usually the one that yields the best predictive accuracy.

The prior art is thus limited in the tools it offers advertisers to determine which people to solicit. A strategy of soliciting everyone in the advertisers' databases can be counterproductive, whereas prior art decision theoretic approaches have objectives that are not always aligned with the interests of the advertisers. For these and other reasons, there is a need for the present invention.

SUMMARY OF INVENTION

The invention relates to a decision theoretic approach for targeted solicitation, by maximizing expected profit increases. The invention identifies a sub-population of a population to solicit by using a decision theoretic model constructed to maximize an expected increase in profits. Once this sub-population has been identified, they are then solicited, such as by e-mail, mail, or phone call.

In particular, one embodiment uses a decision theoretic model known as a decision tree. The decision tree has paths from a root node to a number of leaf nodes. To maximize the expected increase in profits, the decision tree has what is known as a split on a solicitation variable in every path from the root node to each leaf node. The solicitation variable has two values, a first value corresponding to a solicitation having been made, and a second value corresponding to a solicitation not having been made.

The decision tree is constructed from a sample of the population on which a randomized experiment has been performed. The members of the sample are divided into a solicitation group and a non-solicitation group. The former group is solicited, whereas the latter group is not. Correspondingly, the solicitation variable for each member of the solicitation group is set to the first value, whereas for each member of the non-solicitation group it is set to the second value. Once purchases are made by some of the members of each group after a period of time, a purchase variable is set for each member of the groups. The purchase variable has two values, a first value corresponding to a purchase having been made, and a second value corresponding to a purchase not having been made. For the members of either group that have made a purchase the purchase variable is set to the first value, whereas for the other members of either group it is set to the second value. The tree itself may be constructed using what is known as a greedy approach. The split on the solicitation variable in one particular case can be the first split on each path, whereas in another particular case it can be the last split on each path.

A decision theoretic model constructed according to the invention is aligned with the interests of the advertiser. The advertiser's goal of selling the most items at the highest price is always consistent with a model constructed to maximize the advertiser's expected increase in profits. For example, the model is likely not to recommend soliciting an individual having the characteristics of someone who will never purchase an item, because this does not correspond to an increase in profits. As another example, whereas someone who is already interested in purchasing the item may respond to a solicitation, the model is not likely to recommend soliciting this person because profits would decrease in doing so. If the solicitation offers a discounted price on the item, for instance, soliciting someone who would buy the item anyway at a higher price means that the advertiser loses revenue equal to the higher price minus the discounted price.

In addition to the embodiments, aspects, and advantages described in the summary, other embodiments, aspects, and advantages of the invention will become apparent by reading the detailed description and by referencing the drawings.

BRIEF DESCRIPTION OF DRAWINGS

FIG. 6 is a flowchart of a method performed by one embodiment to construct a decision tree having a split on a solicitation variable in every path between the root node and each leaf node. The decision tree in particular has a first split on the solicitation variable in every path between the root node and each leaf node.

FIGS. 7A and 7B are flowcharts of a method of an example greedy approach to decision tree construction that can be used by the method of FIG. 6.

FIG. 8 is a flowchart of a method performed by one embodiment to construct a decision tree having a split on a solicitation variable in every path between the root node and each leaf node. The decision tree in particular has a last split on the solicitation variable in every path between the root node and each leaf node.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

MEMBER TYPES AND OVERVIEW OF GENERAL APPROACH TO TARGETED ADVERTISING

Figure 1:
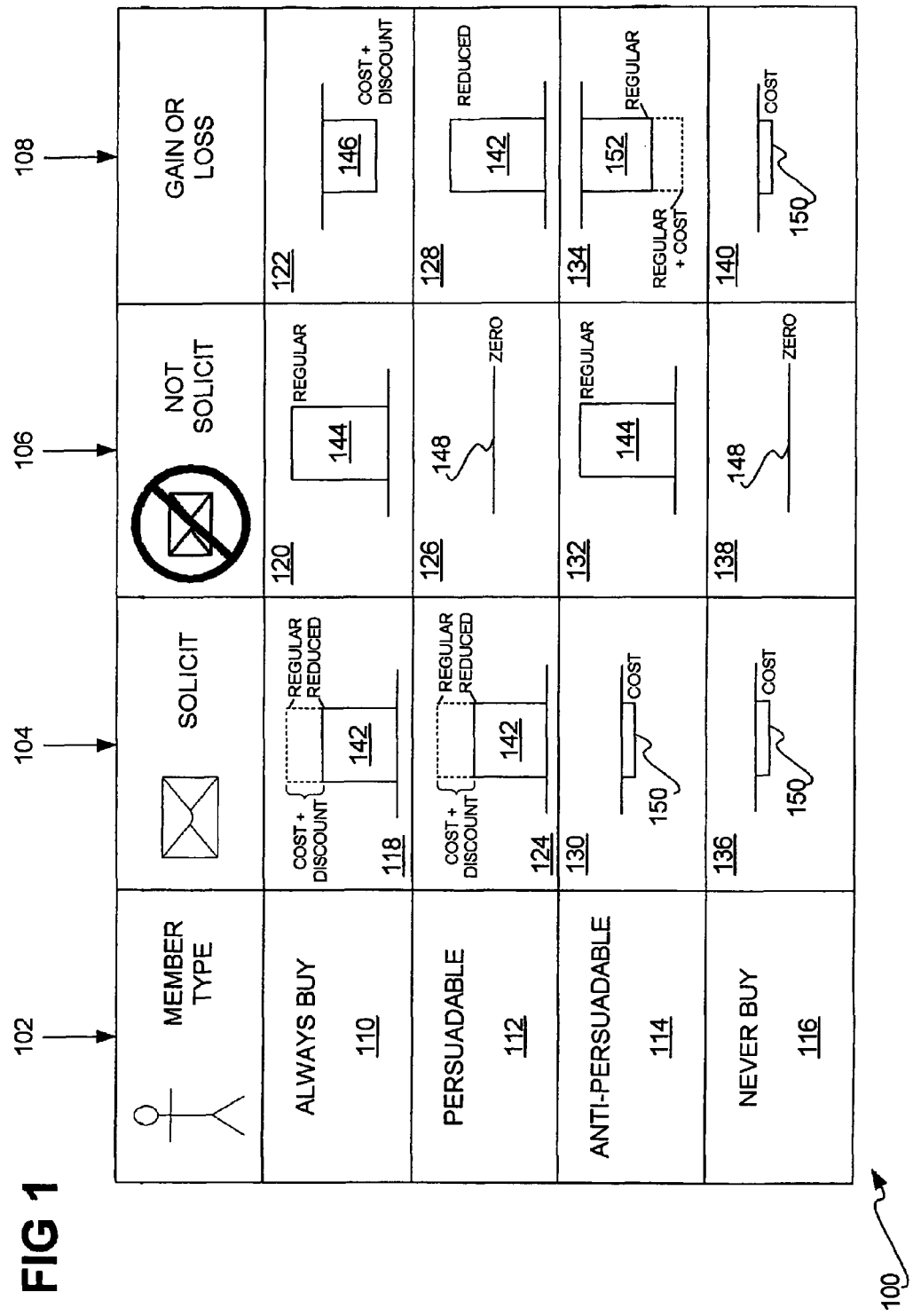
FIG. 1 is a table showing the types of members, and the gains or losses associated with the member types when soliciting them, as opposed to not soliciting them.

FIG. 1 is a diagram of a table 100 showing the various types of members that can be solicited, and the effect on revenue of soliciting them versus not soliciting them. A member is generally any type of entity that can be solicited. Members may be individuals, corporate customers, other organizational customers, or other types of members. The table 100 is divided into four columns, a column 102, a column 104, a column 106, and a column 108. The column 102 shows the different types of members. The member type 110 is an always buy member, who makes a purchase regardless of whether being solicited. The member type 112 is a persuadable member. The persuadable member only makes a purchase if he or she is solicited. The member type 114 is an anti-persuadable member, who makes a purchase only if not solicited. Finally, the member type 116 is a never buy member, who never makes a purchase regardless of whether being solicited.

The columns 104 and 106 indicate the advertiser's revenue when soliciting the member types and not soliciting the member types, respectively. The column 108 indicates the gain or loss incurred by the advertiser from soliciting the member types, as compared to not soliciting the member types. The values in the column 108 are generated by subtracting the revenue realized from non-solicitation in the column 106 from the revenue realized from solicitation in the column 104.

As indicated in the box 118, the always buy member type 110 generates revenue for the advertiser equal to the amount 142 when solicited. This reduced revenue is the regular price of the item, minus the cost of solicitation, and the discount on the regular price offered in the solicitation. If not solicited, as indicated in the box 120, the always buy member type 110 generates revenue equal to the amount 144, which is the regular price of the item. As indicated in the box 122, by soliciting the always buy member type 110, the advertiser realizes a loss in potential revenue equal to the amount 146. The amount 146 is the amount 142 in the box 118 minus the amount 144 in the box 120. The amount 146 is equal to the cost of solicitation plus the discount on the regular price offered in the solicitation. Soliciting the always buy member type 110 thus results in a loss in potential revenue to the advertiser.

As indicated in the box 124, the persuadable member type 112 also generates revenue for the advertiser equal to the amount 142 when solicited. However, if not solicited, as indicated in the box 126, the persuadable member type 112 generates zero revenue, which is indicated as the amount 148. This is because the persuadable member type 112 will not make a purchase if not solicited. Therefore, as indicated in the box 128, by soliciting the persuadable member type 128, the advertiser realizes a gain in revenue equal to the amount 142.

As indicated in the box 130, the anti-persuadable member type 114 generates a loss for the advertiser equal to the amount 150 when solicited. The amount 150 is the cost of solicitation. If not solicited, as indicated in the box 132, the anti-persuadable member type 114 generates revenue equal to the amount 144. The anti-persuadable member type 114 only makes a purchase if not solicited, so soliciting this member type results in a loss of revenue for the advertiser. This is indicated in the box 134, which shows that the advertiser realizes a loss in revenue equal to the amount 152. The amount 152 is the cost of solicitation, indicated as the amount 150, minus the regular price of the item, indicated as the amount 144.

Finally, as indicated in the box 136, the never buy member type 116 also generates a loss for the advertiser equal to the amount 150 when solicited. If not solicited, as indicated in the box 138, the never buy member type 116 generates no revenue, as indicated by the amount 148. Therefore, as indicated in the box 140, by soliciting the never buy member type 116, the advertiser realizes a loss in revenue equal to the amount 150, or the cost of solicitation.

The number of members of the different member types in a given population can be referred to as $N_{al}$, $N_{per}$, $N_{anti}$, and $N_{nev}$, corresponding to the member types 110, 112, 114, and 116, respectively. $N_{al}$ is the number of members of the always buy member type 110. $N_{per}$ is the number of members of the persuadable member type 112. $N_{anti}$ is the number of members of the anti-persuadable member type 114. $N_{nev}$ is the number of members of the never buy member type 116. The total number of members in the population is referred to as N. The cost of solicitation, equal to the amount 150, is referred to as c. The actual profit that results from an unsolicited purchase is referred to as r, which is that portion of the amount 144 that is profit for the advertiser. The actual profit that results from a solicited purchase is referred to as s, which is that portion of the amount 142 that is profit for the advertiser, not taking into account the cost of solicitation, c. The value s is equal to the value r minus the discount in price offered in the solicitation.

The expected profit from soliciting a member therefore is:

$$-c + \frac{(N_{al} + N_{per})}{N} \times s. \quad (1)$$

It costs c to conduct a solicitation. If the member is of the always buy member type 110, which is the probability $N_{al}/N$, or of the persuadable member type 112, which is the probability $N_{per}/N$, then the member will pay s. If the member is of per either of the other member types 114 and 116, then the member will not pay anything for being solicited. The expected profit from not soliciting a member is similarly:

$$\frac{(N_{al} + N_{anti})}{N} \times r \quad (2)$$

This is because the always-buy member type 110 and the anti-persuadable member type 114 will pay the unsolicited price r if they do not receive the solicitation. The other member types 112 and 116 will never make a purchase.

The decision whether or not to solicit to a member is whether the expected profit from solicitation is larger than the expected profit from non-solicitation: solicitation:

$$-c + \frac{(N_{al} + N_{per})}{N} \times s > \frac{(N_{al} + N_{anti})}{N} \times r. \quad (3)$$

This is equivalent to:

$$\frac{(N_{al} + N_{per})}{N} \times s - \frac{(N_{al} + N_{anti})}{N} \times r - c > 0. \quad (4)$$

The left side of equation (4) is the expected increase, or lift, in profits realized by the advertiser from the solicitation.

The terms $$\frac{(N_{al} + N_{per})}{N} \text{ and } \frac{(N_{al} + N_{anti})}{N}$$

in equation (4) can be estimated from collected data. That is, the terms are statistically identifiable. In particular, the term $$\frac{(N_{al} + N_{per})}{N}$$

represents the fraction of members who will make a purchase if they receive a solicitation. Conversely, the term $$\frac{(N_{al} + N_{anti})}{N}$$

represents the fraction of members who make a purchase if they do not receive a solicitation. As will be described, in a pre-modeling phase of the invention data is collected to estimate these fractions.

The binary variable S is used as a solicitation variable having values corresponding to solicited and not solicited, such as one and zero, respectively. The binary variable B is used as a purchase, or buy, variable having values corresponding to purchased and not purchased, such as one and zero, respectively. Using these variables, the identifiable fractions can be rewritten as:

$$\frac{(N_{al} + N_{per})}{N} = p(B = \text{purchased} | S = \text{solicated}), \quad (5)$$

$$\frac{(N_{al} + N_{anti})}{N} = p(B = \text{purchased} | S = \text{not solicated}). \quad (6)$$

Using equations (5) and (6), the expected increase in profits, referred to as ELP, in equation (4) can be rewritten as:

$$ELP = s \times p(B=\text{purchased}|S=\text{solicited}) - r \times p(B=\text{purchased}|S=\text{not solicited}) - c \quad (7)$$

Furthermore, the expected increase, or lift, in profits can be defined for a particular sub-population. That is, ELP can be defined as ELP(X=x) for all members that have features, or attributes, X=x, such that members with these features are solicited only if ELP(X=x)>0. Equation (7) can thus be rewritten as:

$$ELP(X=x) = s \times p(B=\text{purchased}|S=\text{solicited}, X=x) - r \times p(B=\text{purchased}|S=\text{not solicited}, X=x) - c \quad (8)$$

A statistical model is constructed that encodes the probabilities of equation (8).

Figure 2:
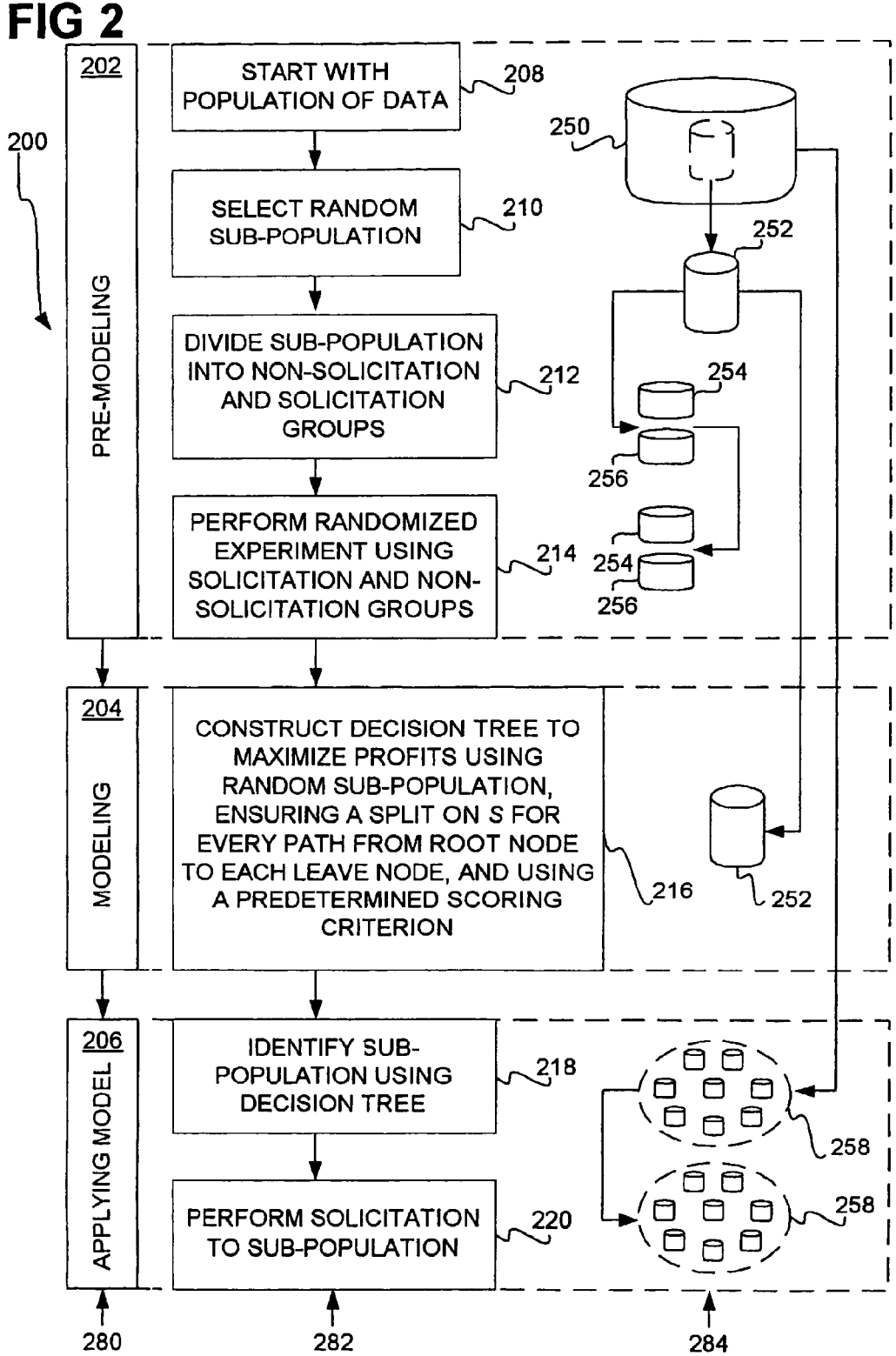
FIG. 2 is a diagram showing the overall approach followed by the invention to identify and solicit a sub-population of a population of data to maximize an expected increase in profits. The diagram also shows a more detailed approach followed by an embodiment of the invention, and the manner by which the embodiment uses the population of data.

FIG. 2 is a diagram 200 that in the column 280 shows an overview of the approach followed by the invention to identify and solicit the sub-population that maximizes the expected increase in profits of equations (7) and (8). The columns 282 and 284 of the diagram show the approach in more detail and the manner by which the approach uses a population of data, respectively. The columns 282 and 284 are described in more detail later in the detailed description.

There are three phases identified in the column 280, a pre-modeling phase 202, a modeling phase 204, and an applying model phase 206. In the pre-modeling phase 202, data is collected so that the fractions of equations (5) and (6) can be estimated. From this collected data, a decision theoretic model is constructed in the modeling phase 204 to maximize the expected increase in profits of equation (7). The decision theoretic model can be a Bayesian network, a generalized linear model, a support vector machine, a relevance vector machine, a decision tree, or another type of model. Finally, in the applying model phase 206, the decision theoretic model is used to identify the actual sub-population of members to solicit, and these members are then solicited.

The approach identified by the column 280 can be used by advertisers to determine which members to solicit to maximize an expected increase in profits. An advertiser can be any type of person, corporation, or other organization interested in having members purchase its items. An item can be any type of product or service. As has been described, a member can be any type of person, corporation, or other organization that may potentially purchase the items offered by the advertiser.

PRE-MODELING PHASE

In the column 282 of FIG. 2, the pre-modeling phase 202 is shown in more detail as 208, 210, 212, and 214. In 208, the pre-modeling phase 202 starts with a population of data. This population is represented in the column 284 as the population 250. The population includes a number of members, and also attributes of the members, which are referred to as features. For example, the features may include demographic information regarding the members, such as gender, occupation, income bracket, and other information. The purpose of the pre-modeling phase 202 is to obtain values for a sample of the population for the solicitation variable S and the purchase variable B.

In 210, a random sub-population, or sample, is selected from the population. This sample is represented in the column 284 as the sample 252. The sample 252 is selected, as opposed to using the entire population 250, for ease of model construction and other purposes. In 212, the random sub-population is divided into non-solicitation and solicitation groups. This is represented in the column 284 as the groups 254 and 256, respectively. It is advisable in 212 to ensure that the process by which members of the sample 252 are placed into the non-solicitation and the solicitation groups 254 and 256 does not depend on any of the features or other distinctions of the population. For example, the sub-population can be divided into the two groups 254 and 256 randomly, with each group having roughly half of the members of the sample 252.

Figure 3:
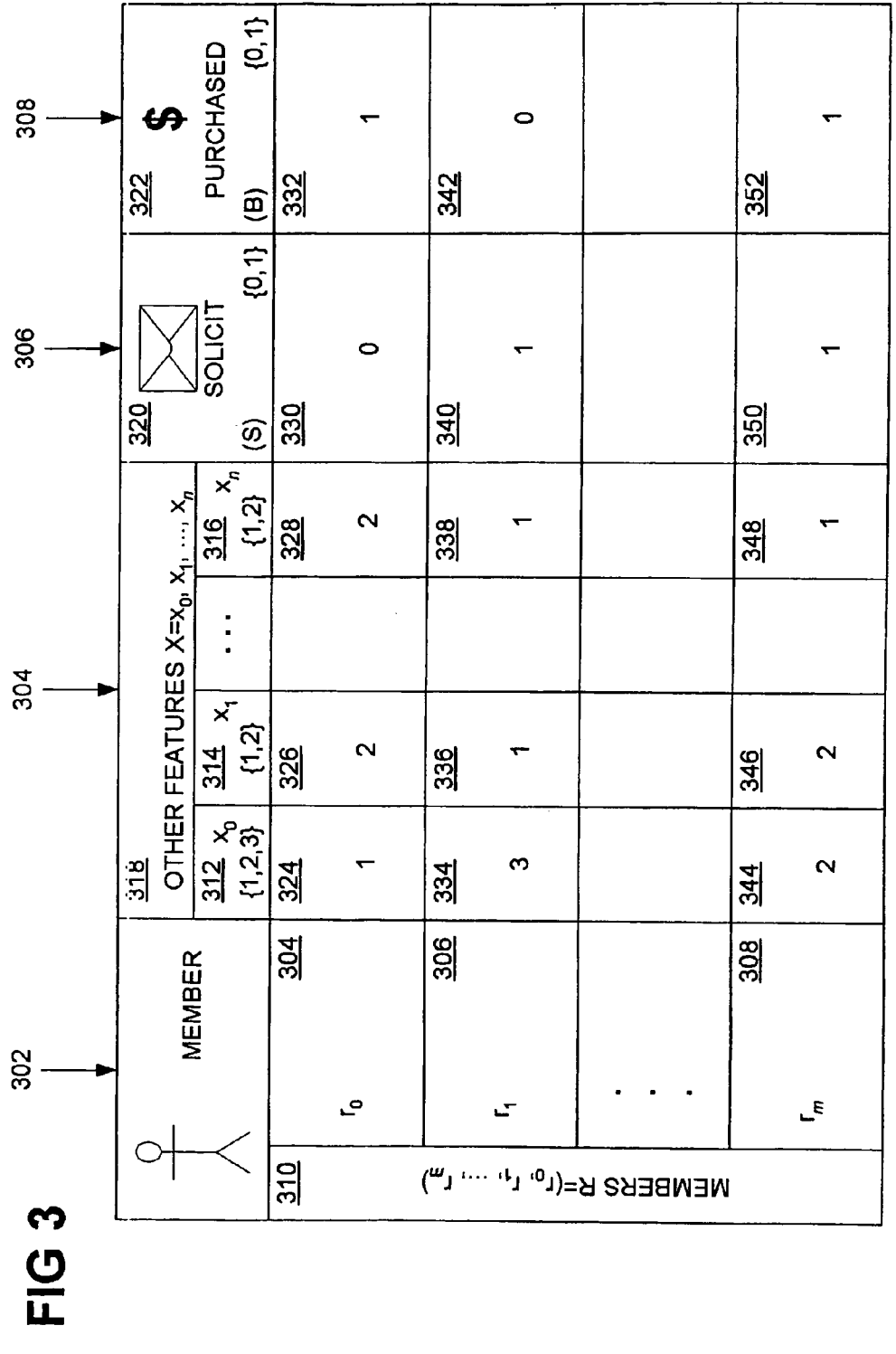
FIG. 3 is a table showing an example population of data, including the data collected from performance of the pre-modeling randomized experiment shown in FIG. 2.

In 214, a randomized experiment is conducted on the non-solicitation group 254 and the solicitation group 256 to obtain values for the variables S and B for members of both groups. The result of the randomized experiment is a collection of data shown in the table 300 of FIG. 3. The column 302 identifies the members 310 of the sample sub-population 252, including the members $R=(r_0, r_1, \ldots, r_n)$, identified as the members 304, 306, 308, respectively. Each of the members 310 has values for the features 318 and the solicitation and the purchased variables 320 and 322, as indicated in the columns 304, 306, and 308, respectively. The values of the features 318 and the solicitation and the purchased variables 320 and 322 for a given member 304, 306, or 308, along with the given member itself, are referred to as a record within the population of data.

The features 318 are identified as $X=(x_0, x_1, \ldots, x_n)$, identified as the features 312, 314, 316, respectively. The feature 312 for a given member can have a value selected from $\{1, 2, 3\}$, whereas the features 314 and 316 are binary features. That is, each of the features 314 and 316 can have a value selected from two different values $\{1, 2\}$. These features 312, 314, and 316 can correspond to different demographic information, for example. The feature 312 may correspond to occupation, where a value of one indicates programmer, a value of two indicates lawyer, and a value of three indicates doctor. The feature 314 may correspond to gender, where a value of one indicates male, and a value of two indicates female. The feature 316 may correspond to income bracket, where a value of one indicates an annual income of less than $70,000, and a value of two indicates an annual income of greater than $70,000.

The features 312, 314, and 316 are discrete features, in that for a given member each can have a value selected from a discrete number of values. Alternatively, features can be continuous features, which for a given member can have a value within a range of values. For example, the feature 316 has been described as corresponding to income bracket, where the feature 316 has one of two values for each member. Alternatively, the feature 316 may be a continuous income feature, having any value greater than zero for each member.

The member 304 has values 1, 2, and 2 for the features 312, 314, and 316, as indicated in the boxes 324, 326, and 328, respectively. For the solicitation and the purchased variables 320 and 322, the member 304 has values 0 and 1, as indicated in the boxes 330 and 332, respectively. The member 306 has values 3, 1, and 1 for the features 312, 314, and 316, as indicated in the boxes 334, 336, and 338, respectively. For the solicitation and the purchased variables 320 and 322, the member 306 has the values 1 and 0, as indicated in the boxes 340 and 342, respectively. The member 308 has values 2, 2, and 1 for the features 312, 314, and 316, as indicated in the boxes 344, 346, and 348, respectively. Finally, for the solicitation and the purchased variables 320 and 322, the member 308 has values 1 and 1, as indicated in the boxes 350 and 352, respectively. The values of the features for the members are initially in the data of the sample 252, whereas the values for the solicitation and the purchased variables are collected by performing the randomized experiment in 214.

Figure 4:
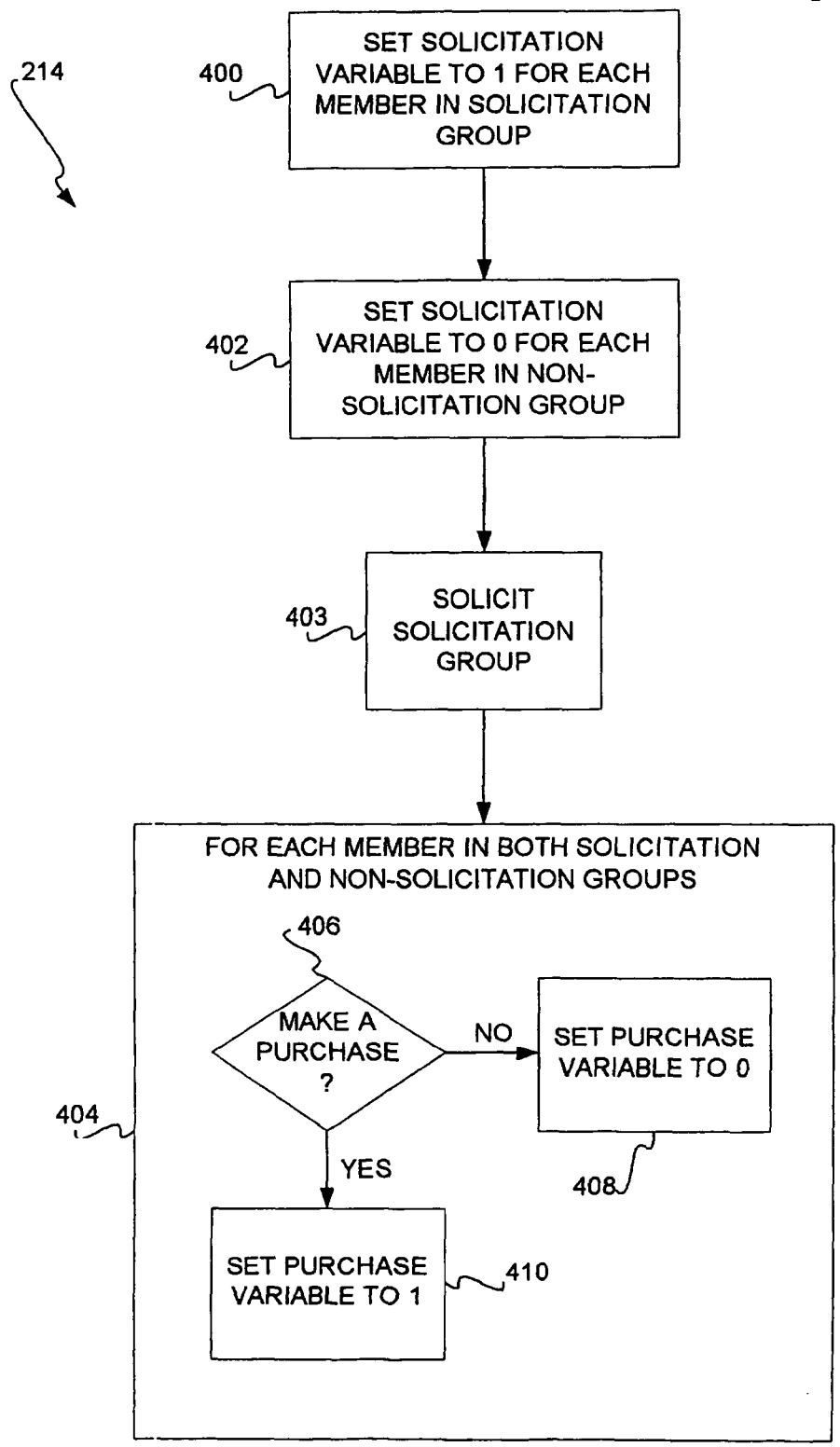
FIG. 4 is a flowchart of a method performed by one embodiment as the randomized experiment shown in FIG. 2.

An example of the randomized experiment performed in 214 to obtain values for the solicitation and the purchased variables for the members of the sample sub-population 252 is shown in the method 214 of FIG. 4. In 400, the solicitation variable S is set to 1 for each member in the solicitation group, whereas, in 402, the solicitation variable S is set to 0 for each member in the non-solicitation group. In 403, the members in the solicitation group are then solicited, whereas the members in the non-solicitation group are not solicited. This is why the members in the solicitation group are assigned a value of 1 for the solicitation variable S, and the members in the non-solicitation group are assigned a value of 0 for the solicitation variable S. In 404, several acts are performed for each member of both the solicitation and the non-solicitation groups. In 406, it is determined whether a given member has made a purchase. If a purchase has not been made, then the purchase variable B is set to 0 for that member in 408. Conversely, if a purchase has been made, then the purchase variable B is set to 1 for that member in 410.

MODELING PHASE

In the column 282 of FIG. 2, the modeling phase 204 is shown in more detail as 216. In 216, a decision theoretic model known as a decision tree is constructed, from the random sub-population selected in 210 and the data collected for this random sub-population in 214. The random sub-population selected in 210 is again represented in column 284 as the sample 252. The decision tree is constructed specifically to maximize profits. More accurately, the decision tree is constructed specifically to maximize the expected increase in profits. This is accomplished by ensuring that there is a split on the solicitation variable S for every path from a root node of the decision tree to each leaf node. A predetermined scoring criterion is used in constructing the decision tree.

A split on a node means that one edge is followed for some values of the variable corresponding to the node, and other edges are followed for other values of the variable. Where there are two edges extending from a node, it is said that there is a binary split at the node. As an example, a feature may correspond to a node and which can have a value one or a value zero. The split on the node may have a first edge associated with the value one of the feature, and a second edge associated with the value two of the feature. When a member is evaluated against the decision tree, if it has the value one for the feature the first edge is followed. Otherwise, the second edge is followed. This example node is said to split on the feature, because the values of the feature determine which edge is followed from the node. A path is referred to as the collection of edges that are followed to reach a given leaf node from the root node.

Figure 5:
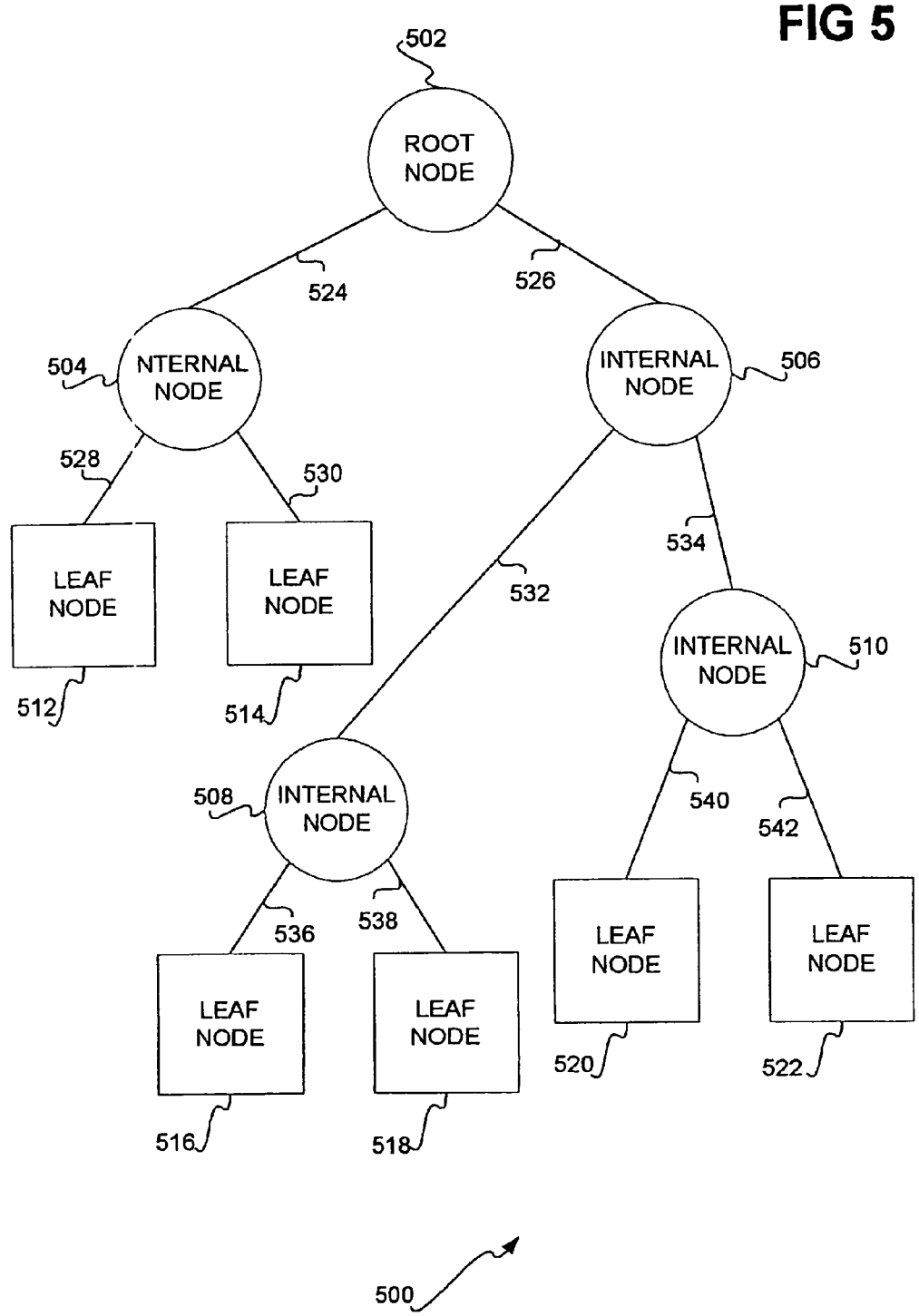
FIG. 5 is a diagram of an example decision tree shown for explanatory purposes.

FIG. 5 is a diagram showing an example decision tree 500 that is used for explanatory purposes. The decision tree 500 has a root node 502, a number of internal nodes 504, 506, 508, and 510, and a number of leaf nodes 512, 514, 516, 518, 520, and 522. At the root node 502, there are two edges, a first edge 524 to the internal node 504, and a second edge 526 to the internal node 506. There is thus a binary split at the root node 502. There is also a binary split at the internal node 506, with a first edge 532 to the internal node 508, and a second edge 534 to the internal node 510. At each of the internal nodes 504, 508, and 510, there is a binary split to a pair of leaf nodes. Specifically, at the internal node 504, there is a first edge 528 to the leaf node 512, and a second edge 530 to the leaf node 514. At the internal node 508, there is a first edge 536 to the leaf node 516, and a second edge 538 to the leaf node 518. Similarly, at the internal node 510, there is a first edge 540 to the leaf node 520, and a second edge 542 to the leaf node 522.

If the example decision tree 500 is constructed in accordance with the invention, then there is a split on the solicitation variable S for every path from the root node 502 to each of the leaf nodes 512, 514, 516, 518, 520, and 522. This ensures that the decision tree is constructed specifically to evaluate the expected lift in profits, and consequently the total profit that results from using the tree 500. Having a split on the solicitation variable S for every path from the root node 502 to each leaf node is accomplished specifically in at least two ways. First, there can be a first split on the solicitation variable S on every path from the root node 502 to each of the leaf nodes 512, 514, 516, 518, 520, and 522. This means that the root node 502 corresponds to a split on the solicitation variable S. One of the edges 524 and 526 corresponds to the solicitation variable S having a value of 1, and the other of the edges 524 and 526 corresponds to the variable having a value of 0.

Second, there can be a last split on the solicitation variable S on every path from the root node 502 to each of the leaf nodes 512, 514, 516, 518, 520, and 522. This means that the internal nodes 504, 508, and 510 each correspond to a split on the solicitation variable S. With respect to the internal node 504, one of the edges 528 and 530 corresponds to the solicitation variable S having a value of 1, and the other of the edges 528 and 530 corresponds to the variable having a value of 0. With respect to the internal node 508, one of the edges 536 and 538 corresponds to the solicitation variable S having a value of 1, and the other of the edges corresponds to the variable having a value of 0. Likewise, with respect to the internal node 510, one of the edges 540 and 542 corresponds to the solicitation variable S having a value of 1, and the other of the edges corresponds to the variable having a value of 0.

CONSTRUCTING A DECISION TREE WITH A FIRST SPLIT ON THE SOLICITATION VARIABLE

FIG. 6 is a flowchart of a method 216' that can be used as one embodiment in 216 of FIG. 2 to construct a decision tree with a first split on the solicitation variable S. In 600, the decision tree is initialized with a first split on the solicitation variable S. This means that the root node of the tree corresponds to the solicitation variable S. In 602, the remainder of the decision tree is constructed using a greedy approach. A greedy approach to constructing a decision tree is one in which an initial tree is compared with the initial tree having a given split. If the tree with the given split is better according to a predetermined scoring criterion than the initial tree, then the tree with the given split is kept. Otherwise, the initial tree is compared with the initial tree having a different split. This process is repeated until the entire decision tree has been constructed.

Figure 7B:
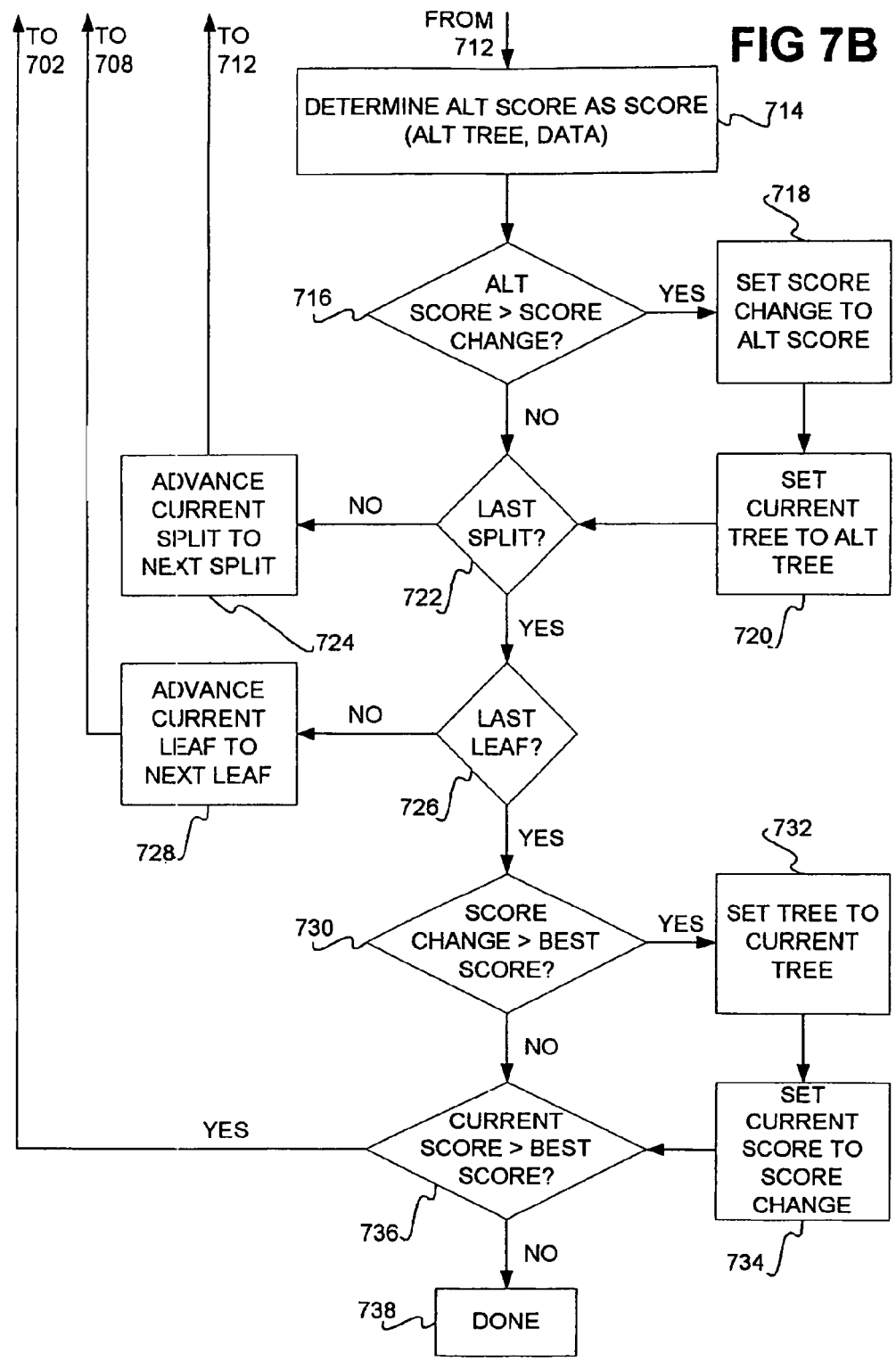

An example greedy approach is shown in the flowchart of FIGS. 7A and 7B as the method 602. In 700, a current score is determined by using a predetermined scoring criterion against the decision tree. This criterion is specified as the function score (decision tree, data), where the data is the random sub-population 252 with which data for the solicitation variable S and the purchase variable B have been collected previously in 214 of FIG. 2. In 702, a best score is set to the current score, and, in 704, a score change is set to negative infinity. In 706, a current leaf is set to the first leaf in the tree. In the case of the decision tree having a first split on the solicitation variable S, there will be two leafs in the decision tree initially. The first leaf originates from the edge corresponding to the variable S being zero, and the second leaf from the edge corresponding to the variable S being one.

In 708, all the possible splits at the current leaf are determined, except for splits on the solicitation variable S. In 710, a current split is set to the first possible split determined in 708. In 712, an alternative decision tree is constructed as the decision tree with the current split, and an alternative score is determined in 714 using the predetermined scoring criterion. The alternative score is determined as the function score (alternative decision tree, data). If the alternative score is greater than the score change, then the method proceeds from 716 to 718, in which the score change is set to the alternative score. In 720, a current decision tree is set to the alternative tree. The method 602 proceeds to 722 from 716 if the alternative score is not greater than the score change, or from 720.

If the current split is not the last possible split determined in 708, then the method 602 proceeds to 724 from 722, in which the current split is advanced to the next possible split, and the method 602 proceeds back to 712. Otherwise, the method 602 proceeds to 726. If the current leaf is not the last leaf of the current decision tree, then the method 602 proceeds to 728 from 726, in which the current leaf is advanced to the next leaf, and the method 602 proceeds back to 708. Otherwise, the method 602 proceeds to 730. If the score change is greater than the best score, then in 732 the decision tree is set to the current decision tree. In 734, the current score is set to the score change, and the method 602 proceeds to 736. The method 602 also proceeds to 736 from 730 if the score change is not greater than the best score. If the current score is greater than the best score, then the method 602 proceeds from 736 back to 702. Otherwise, the method 602 ends at 738, and the decision tree has been constructed.

Pseudo-code for the method 602 can be written as:

```
GreedyDecisionTreeConstruction
Input: Dataset D, Scoring criterion Score (T,D)
Output: Decision Tree T
Initialize T to be a single leaf node
scoreBest := -Infinity
scoreTree := Score (T,D)
while (scoreTree > scoreBest)
{
    scoreBest = scoreTree
    scoreBestChange = -Infinity
    for each leaf L in T
    {
        for each possible split at L
        {
            Let T' be the result of replacing L with the
            given split
            if Score (T',D) > scoreBestChange
            {
                scoreBestChange = scoreBest
                Set Tbest = T'
            }
        }
    }
    if scoreBestChange > scoreBest
    {
        T = Tbest
        ScoreTree = scoreBestChange
    }
}
End
```

It is noted that the initialization performed in the pseudo-code is not a single leaf node, as in the method 602, but rather a tree consisting of a split on that node.

CONSTRUCTING A DECISION TREE WITH A LAST SPLIT ON THE SOLICITATION VARIABLE

FIG. 8 is a flowchart showing a method 216" that can be used as one embodiment in 216 of FIG. 2 to construct a decision tree with a last split on the solicitation variable S. In 800, the decision tree is initialized as a single node, which is both the only leaf node and the only root node of the decision tree. The node can correspond to any feature or variable except for the solicitation variable S. The method 216" proceeds from 800 to 602', where the tree is constructed using a greedy approach, such as similar to that which has been described as the method 602 of FIGS. 7A and 7B. The difference is that the greedy approach of 602' employs a scoring criterion that evaluates each tree as if it contained a split on the solicitation variable S on each leaf node.

Figure 9:
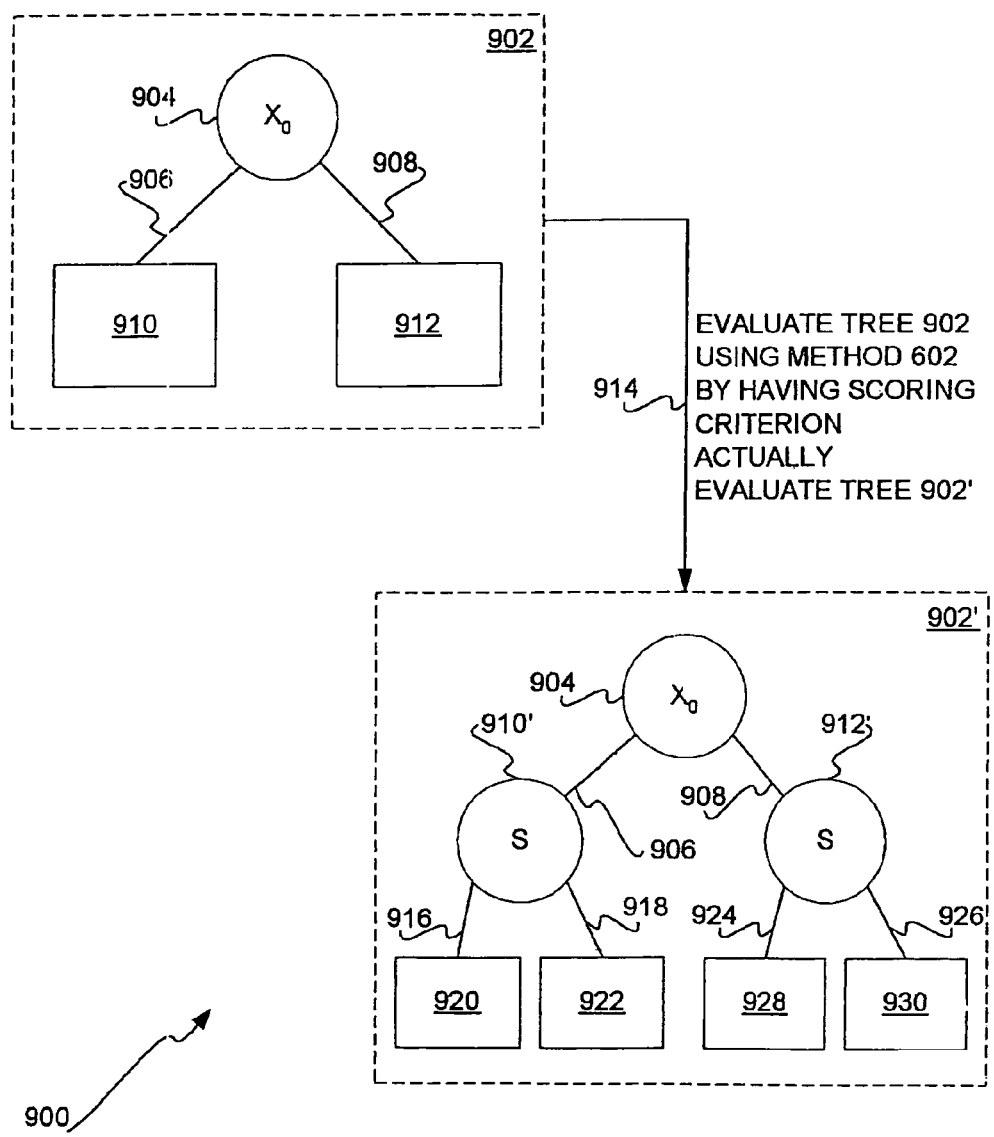
FIG. 9 is a diagram showing how the method of FIG. 8 can use the example greedy approach of the method of FIGS. 7A and 7B.

An example of how the greedy approach of 602' is performed is shown in the diagram 900 of FIG. 9. The partially constructed tree 902 is being evaluated by the greedy approach of 602'. The tree 902 has a root node 904 having a binary split on the feature $x_0$. Edges 906 and 908 extend from the root node 904. The edge 906 leads to the leaf node 910, whereas the edge 908 leads to the leaf node 912. As indicated by the arrow 914, the greedy approach of 602' employs the method 602 to evaluate the tree 902 by actually having the scoring criterion of the method 602 evaluate the tree 902'. The partially constructed tree 902' is the tree 902 with a split on the solicitation variable S at each leaf node. The leaf node 910 of the tree 902 becomes the internal node 910' in the tree 902', having a binary split on the solicitation variable S. Two edges extend from the node 910' as a result, a first edge 916 leading to a new leaf node 920, and a second edge 918 leading to another new leaf node 922. Likewise, the leaf node 912 of the tree 902 becomes the internal node 912' in the tree 902', having a binary split on the solicitation variable S. Two edges extend from the node 912', a first edge 924 leading to a new leaf node 928, and a second edge 926 leading to another new leaf node 930.

Referring back to FIG. 8, when 602' is finished, the resulting decision tree is complete, except that there is no split on the solicitation variable S. Therefore, in 802, a split is performed at each leaf node of the decision tree on the solicitation variable S, to explicitly add the last splits on the solicitation variable S. The final decision tree that results then has a last split on the solicitation variable S.

SCORING CRITERIA

At least four different scoring criteria can be used as the predetermined scoring criterion when constructing the decision tree. The first scoring criterion is referred to as a holdout criterion. For this criterion, the sub-population 252 and the collected data for the variables S and B are partitioned into two new groups: a construction group, and an evaluation group. The construction group is actually used to construct the decision tree, such as by using the greedy approach of the method 602 of FIGS. 7A and 7B. Conversely, the evaluation group is used only to evaluate the decision tree. Where the scoring criterion is written as a function score (decision tree, data), the data used in this case is the evaluation group only. In particular, the expected increase in profits is determined for each record in the evaluation group. If the expected increase for a given record is positive, it is added to the score. Otherwise, nothing is added to the score for the record. Therefore, the score when using the holdout criterion is:

$$score = \sum_{r \in evalgroup} ELP(r) > 0 \qquad (9)$$

The second scoring criterion is referred to as a cross-validation holdout criterion. The cross-validation holdout criterion is the same as the holdout criterion, but the average score for multiple groups of the sub-population is used. The sub-population 252 is partitioned into a number of equally sized groups. One group is assigned as the evaluation group, and the remaining groups are assigned as the construction group. The score for this evaluation group is then determined. The process is repeated so that each group has an opportunity to be the evaluation group. The average score for all the different evaluation groups is then determined and is used as the score of the decision tree.

The third scoring criterion is referred to as a marginal likelihood criterion. The marginal likelihood is a known data quality, or attribute, and is the ordinary likelihood as a function of the data and the model averaged over parameters with respect to a prior distribution. This criterion is proportional to the condition probability p(decision tree/data), where the data is the sub-population 252. The criterion evaluates how probable the independence assumptions of the structure of the decision tree are given the data.

The fourth scoring criterion is referred to as an adjusted marginal likelihood criterion, which is based on the marginal likelihood criterion. The difference with the adjusted marginal likelihood criterion is that the marginal likelihood score for a corresponding decision tree is subtracted from the marginal likelihood score for the decision tree as determined using the marginal likelihood criterion. The corresponding decision tree is the decision tree without the purchased variable B. The adjusted marginal likelihood criterion overcomes strong correlations that may exist between the solicitation variable S and the purchased variable B.

APPLYING MODEL PHASE

In the column 282 of FIG. 2, the applying model phase 206 is shown in more detail as 218 and 220. In 218, the sub-populations to solicit are identified using the decision tree constructed in 216. These sub-populations are the groups 258 of those members of the population 250 that should be solicited to increase expected profits. The features of each member of the populations 252 are denoted by the set X, and are used to proceed through the decision tree constructed in 216 to extract the two probabilities necessary to evaluate the expected increase, or lift, in profits.

The expected lift in profits, ELP(X), is determined by using equation (8), which is repeated here for explanatory clarity:

$$ELP=(X=x)=s \times p(B=\text{purchased}|S=\text{solicited}), X=x)-r \times p(B=\text{purchased}|S=\text{not solicited}, X=x)-c \quad (8)$$

As indicated in equation (8), ELP(X) is a function of two probabilities,
p(B=purchased|S=solicited, X=x)
and
p(B=purchased|S=not solicited, X=x)

These probabilities are extracted directly from the leaf nodes of the decision tree constructed in 216. If the expected lift in profits when soliciting a member is greater than zero, then the member is added to the group 258 of members that should be solicited. Once all the members have been processed through the decision tree, the resulting group 258 is solicited in 220. The solicitation can be by mail, phone call, e-mail, or another type of solicitation.

Figure 10:
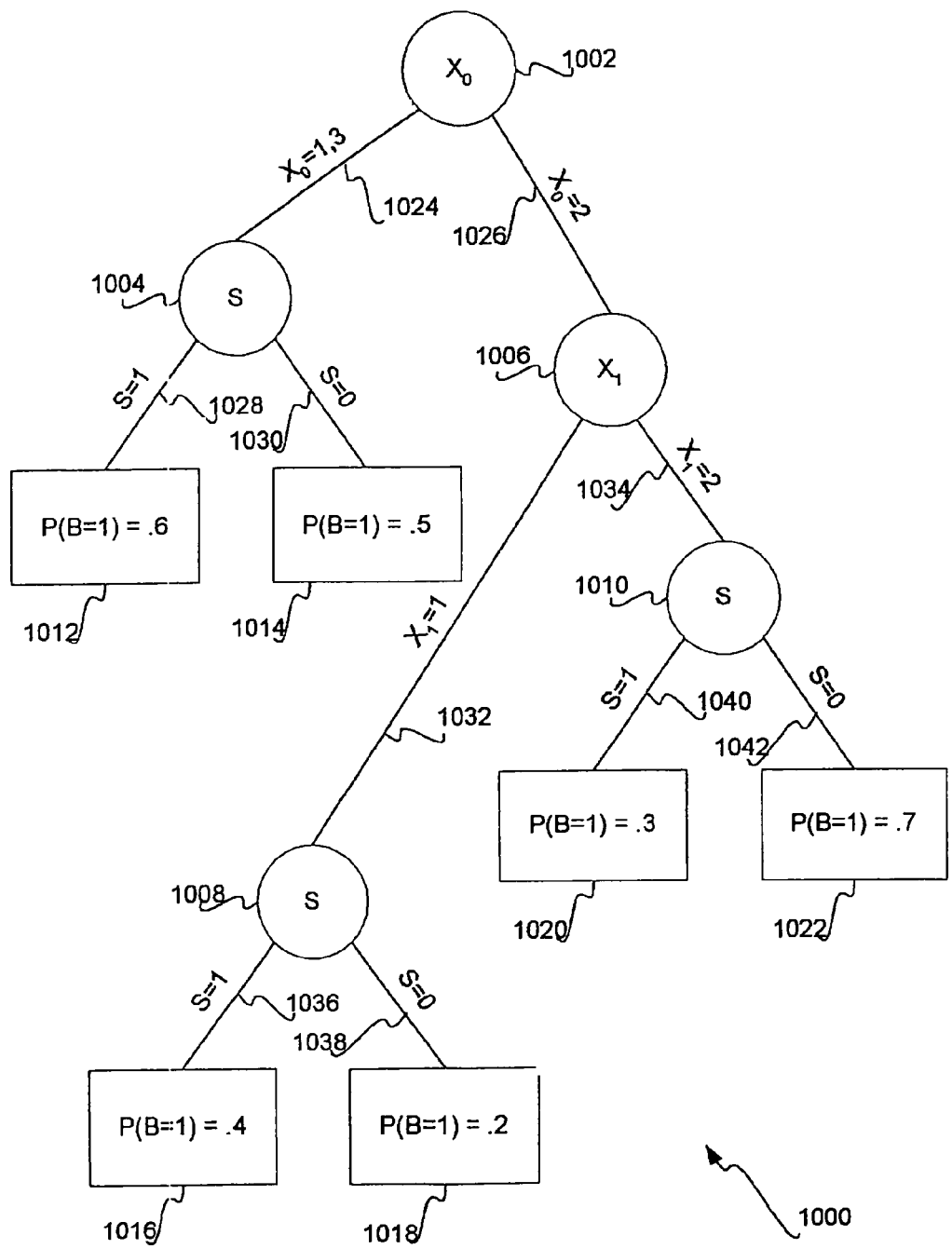
FIG. 10 is a diagram of an example decision tree that may be constructed and used to identify the sub-population to which solicitation should be made to maximize an expected increase in profits.

An example decision tree constructed in 216, and which can be used in 218 to identify the group 258 to solicit, is shown in the diagram of FIG. 10. The decision tree 1000 of FIG. 10 is specifically for a decision tree based on the collection of data shown in the table 300 of FIG. 3. The decision tree 1000 is a tree having last splits on the solicitation variable S, such that the probabilities needed to determine the expected lift in profits for each member reside in a pair of leaf nodes of the tree 100.

More specifically, the decision tree 1000 has leaf nodes 1012, 1014, 1016, 1018, 1020, and 1022 that provide probabilities conditional on the purchase variable B. The decision tree 1000 has a root node 1002 that splits based on the value of the feature $x_0$. If the value of this feature for a given member is one or three, then the split 1024 is followed. Otherwise, the split 1026 is followed where the value is two. The split 1024 leads to the internal node 1004, which is split on the solicitation variable S. If a member reaches the internal node 1004, then soliciting the member means that the split 1028 is followed to the leaf node 1012, and the probability of making a purchase, p(B=1), is 60%. Not soliciting the member means that the split 1030 is followed to the leaf node 1014, and the probability of making a purchase is 50%.

To determine whether the member is assigned to the group 258 that is solicited in 220, these probabilities are evaluated in equation (8). For example, the profit r that results from the member making a purchase without solicitation may be ten dollars, whereas the profit s that results from the member making a purchase after solicitation may be nine dollars. The cost of making the solicitation may be one dollar. Evaluating equation (8) for this member results in:

$$ELP(X=x)=s \times p(B=\text{purchased}|S=\text{solicited}, X=x)-r \times p(B=\text{purchased}|S=\text{not solicited}, X=x)-c=\$9 \times 60\%-\$10 \ 50\%-\$1=60¢$$

Because soliciting this member results in an expected decrease in profit of sixty cents, the member is not assigned to the group 258 that is solicited in 220.

Still referring to FIG. 10, the split 1026 leads to the internal node 1006, which is split based on the value of the feature $x_1$. If the value of this feature for a given member is one, then the split 1032 is followed. Otherwise, the split 1034 is followed. The split 1032 leads to the internal node 1008, which is split on the solicitation variable S. If a member reaches the internal node 1008, then soliciting the member means that the split 1036 is followed to the leaf node 1004, and the probability of making a purchase, p(B=1), is 40%. Not soliciting the member means that the split 1038 is followed to the leaf node 1018, and the probability of making a purchase is 20%. The split 1034 leads to the internal node 1010, which is also split on the solicitation variable S. If a member reaches the internal node 1010, then soliciting the member means that the split 1040 is followed to the leaf node 1020, and the probability of making a purchase, p(B=1), is 30%. Not soliciting the member means that the split 1042 is followed to the leaf node 1022, and the probability of making a purchase is 70%.

EXAMPLE COMPUTERIZED DEVICE

Figure 11:
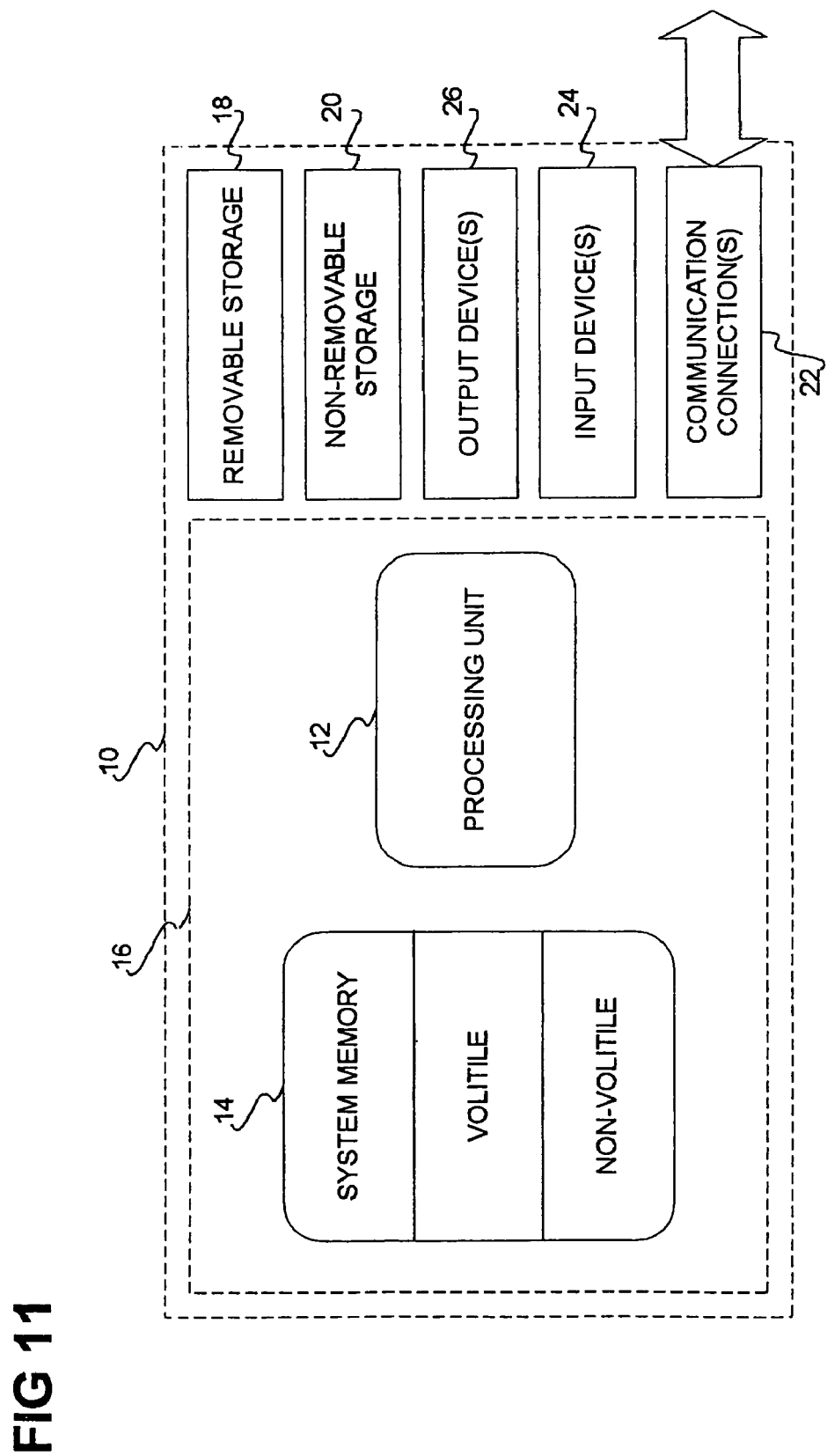
FIG. 11 is a diagram of a computerized environment in conjunction with which the invention may be practiced.

FIG. 11 illustrates an example of a suitable computing system environment 10 on which the invention may be implemented. The computing system environment 10 is only one example of a suitable computing environment and is not intended to suggest any limitation as to the scope of use or functionality of the invention. Neither should the computing environment 10 be interpreted as having any dependency or requirement relating to any one or combination of components illustrated in the exemplary operating environment 10.

The invention is operational with numerous other general purpose or special purpose computing system environments or configurations. Examples of well known computing systems, environments, and/or configurations that may be suitable for use with the invention include, but are not limited to, personal computers, server computers, hand or laptop devices, multiprocessor systems, microprocessor systems. Additional examples include set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An exemplary system for implementing the invention includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated by dashed line 16. Additionally, device 10 may also have additional features/functionality. For example, device 10 may also include additional storage (removable and/or non-removable) including, but not limited to, magnetic or optical disks or tape. Such additional storage is illustrated in by removable storage 18 and non-removable storage 20. Computer storage media includes volatile, nonvolatile, removable, and non-removable media implemented in any method or technology for storage of information such as computer readable instructions, data structures, program modules, or other data. Memory 14, removable storage 18, and nonstorage 20 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Communications connection(s) 22 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or directconnection, and wireless media such as acoustic, RF, infrared and other wireless media. The term computer readable media as used herein includes both storage media and communication media.

Device 10 may also have input device(s) 24 such as keyboard, mouse, pen, voice input device, touch input device, etc. Output device(s) 26 such as a display, speakers, printer, etc. may also be included. All these devices are well know in the art and need not be discussed at length here.

The methods that have been described can be computer-implemented on the device 10. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A method for soliciting a sub-population of a population, the method comprising:
    defining by a computer system an expected increase in profits as a difference between an expected profit from a solicitation and an expected profit from a non-solicitation; and
    analyzing by a computer system a population to identify a sub-population to solicit and a sub-population not to solicit by using a decision theoretic model, the decision theoretic model constructed to maximize the expected increase in profits by soliciting a sub-population that will only make a purchase if solicited and not soliciting at least one of a sub-population that will not make a purchase when solicited or a sub-population that will make a purchase even when it is not solicited.

2. The method of claim 1, wherein using the decision theoretic model comprises using a decision tree, the decision tree having a plurality of paths from a root node to a plurality of leaf nodes, each of the plurality of paths having a split on a solicitation variable having a first value corresponding to solicitation and a second value corresponding to non-solicitation.

3. The method of claim 2, wherein the decision tree is constructed such that the split on the solicitation variable of each of the plurality of paths is a last split.

4. The method of claim 2, wherein the decision tree is constructed such that the split on the solicitation variable of each of the plurality of paths is a first split.

5. The method of claim 2, wherein each of the plurality of leaf nodes provides a value for a probability conditional on at least a purchase variable having a first value corresponding to purchase and a second value corresponding to non-purchase.

6. The method of claim 2, wherein identifying the sub-population to solicit comprises:
    constructing the decision tree from a sample of the population using a predetermined scoring criterion, each of the plurality of leaf nodes of the tree providing a value for a probability conditional on at least a purchase variable; and
    applying the decision tree against the population to identify the sub-population to solicit to maximize the expected increase in profits.

7. The method of claim 6, wherein identifying the sub-population to solicit further initially comprises performing an experiment using the sample of the population to obtain values for the sample of the population for each of the solicitation variable and a purchase variable, the purchase variable having a first value corresponding to purchase and a second value corresponding to non-purchase.

8. The method of claim 1, further comprising soliciting the identified sub-population to solicit by mailing a solicitation to each of a plurality of members of the sub-population to solicit.

9. The method of claim 1, further comprising soliciting the identified sub-population to solicit by e-mailing a solicitation to each of a plurality of members of the sub-population to solicit.

10. The method of claim 1, further comprising soliciting the identified sub-population to solicit by calling each of a plurality of members of the sub-population.

11. A method for constructing a decision theoretic model to identify at least one of a sub-population of a population to solicit or a sub-population of a population not to solicit to maximize an expected increase in profits, the method comprising:
  using a sample of the population to obtain values for the sample of the population for each of a solicitation variable and a purchase variable, the solicitation variable having a first value corresponding to solicitation and a second value corresponding to non-solicitation, and the purchase variable having a first value corresponding to purchase and a second value corresponding to non-purchase;
  utilizing a computer system to construct a decision theoretic model from the sample using a predetermined scoring criterion; and
  applying by a computer system the decision theoretic model against the population to identify at least one of the sub-population to solicit that will make a purchase only if solicited or the sub-population not to solicit that will at least one of not make a purchase when solicited or make a purchase regardless of solicitation; and
  soliciting the sub-population to solicit.

12. The method of claim 11, wherein using the sample of the population to obtain values for the sample of population comprises:
  dividing the sample of the population into a non-solicitation group and a solicitation group;
  setting the solicitation variable to the first value for each of a plurality of members of the solicitation group and to the second value for each of a plurality of members of the non-solicitation group;
  soliciting the solicitation group; and
  setting the purchase variable to the first value for each of the plurality of members of the solicitation and the non-solicitation groups that made a purchase and to the second value for each of the plurality of members of the solicitation and the non-solicitation groups that did not make the purchase.

13. The method of claim 11, wherein the predetermined scoring criterion is at least one of a holdout criterion, a cross-validation holdout criterion, a marginal likelihood criterion, or an adjusted marginal likelihood criterion.

14. The method of claim 11, wherein the decision theoretic model is a decision tree having a plurality of paths from a root node to a plurality of leaf nodes, each of the plurality of paths having a split on the solicitation variable, and each of the plurality of leaf nodes providing a value for a probability conditional on at least the purchase variable, the split on the solicitation variable of each of the plurality of paths is a last split.

15. The method of claim 14, wherein constructing the decision tree comprises:
  initializing the decision tree with an initial single leaf node as the root node;
  using a greedy approach to construct the decision tree with no splits on the solicitation variable, the decision tree after construction using the greedy approach having a plurality of interim leaf nodes; and
  performing a split on the solicitation variable at each of the plurality of interim leaf nodes to generate the plurality of leaf nodes.

16. The method of claim 14, wherein the split on the solicitation variable of each of the plurality of paths is a first split at the root node.

17. The method of claim 16, wherein constructing the decision tree comprises:
  initializing the decision tree with the first split at the root node on the solicitation variable; and
  using a greedy approach to finish constructing the decision tree.

18. A method for constructing a probabilistic model to identify at least one of a sub-population of a population to solicit or a sub-population of a population not to solicit to maximize an expected increase in profits, the method comprising:
  using a sample of the population to obtain values for the sample of the population for each of a solicitation variable and a purchase variable, the solicitation variable having a first value corresponding to solicitation and a second value corresponding to non-solicitation, and the purchase variable having a first value corresponding to purchase and a second value corresponding to non-purchase;
  constructing by a computer system a probabilistic model from the sample using predetermined scoring criterion; and
  applying by a computer system the probabilistic model against the population to identify at least one of the sub-population to solicit that responds in a favorable manner only when solicited or the sub-population not to solicit that at least one of responds in a favorable manner regardless of solicitation or responds in an unfavorable manner when solicited.

19. The method of claim 18, further comprising:
  dividing the sample of the population into a non-solicitation group and a solicitation group;
  setting the solicitation variable to the first value for each of a plurality of members of the solicitation group and to the second value for each of a plurality of members of the non-solicitation group;
  soliciting the solicitation group; and
  setting the purchase variable to the first value for each of the plurality of members of the solicitation and the non-solicitation groups that made a purchase and to the second value for each of the plurality of members of the solicitation and the non-solicitation groups that did not make the purchase.

20. The method of claim 18, further comprising soliciting the sub-population to solicit by one of: calling each of a plurality of members of the sub-population to solicit, mailing a solicitation to each of the plurality of members of the sub-population to solicit, or e-mailing the solicitation to each of the plurality of members of the sub-population to solicit.

* * * * *